United States Patent [19]

Oshima et al.

[11] Patent Number: 5,138,824
[45] Date of Patent: Aug. 18, 1992

[54] SAFETY SYSTEM FOR A LAWN MOWER

[75] Inventors: Hiroshi Oshima; Hideo Ohkura; Hirofumi Sadakane; Yoshio Tomiyama, all of Osaka, Japan

[73] Assignee: Kubota Corporation, Osaka, Japan

[21] Appl. No.: 702,661

[22] Filed: May 17, 1991

[30] Foreign Application Priority Data

May 25, 1990 [JP] Japan .................. 2-54934[U]
Jun. 27, 1990 [JP] Japan .................. 2-169645
Oct. 15, 1990 [JP] Japan .................. 2-276636

[51] Int. Cl.⁵ .............. A01D 34/63; A01D 34/68; A01D 34/76; A01D 75/20
[52] U.S. Cl. .............. 56/10.2; 56/11.3; 56/11.5; 56/11.6; 56/11.8; 56/16.9
[58] Field of Search .............. 56/10.2, 11.5, 11.6, 56/11.8, 16.9, 11.3, 10.8, DIG. 15, DIG. 4

[56] References Cited

U.S. PATENT DOCUMENTS

| | | | |
|---|---|---|---|
| 3,608,285 | 9/1971 | Berk | 56/10.2 |
| 3,626,676 | 12/1971 | Miley et al. | 56/10.2 |
| 3,773,156 | 11/1973 | Nyquist | 56/10.2 X |
| 4,300,332 | 11/1981 | Jackson | 56/11.6 X |
| 4,760,685 | 8/1988 | Smith | 56/10.8 X |
| 4,885,903 | 12/1989 | Scag | 56/10.8 |
| 4,934,989 | 6/1990 | Furukawa et al. | 474/135 |

Primary Examiner—Stephen J. Novosad
Attorney, Agent, or Firm—Jordan and Hamburg

[57] ABSTRACT

A safety system for a lawn mower having an engine, a propelling transmission line for transmitting drive from the engine to drive wheels, and a PTO transmission line for transmitting drive from the engine to a grass cutting unit. An engine start is allowed when the propelling transmission line is inoperative. The engine is stopped when the propelling transmission line is operative and a driver is in a non-driving state. A steering section includes an arch-like steering handle, and an auxiliary handle having a shape substantially corresponding to the steering handle and pivotable from an upper position projecting above the steering handle and a lower position depressed below the steering handle. The driver is determined to be in the driving state when the auxiliary handle is in an intermediate position adjacent the steering handle.

5 Claims, 8 Drawing Sheets

(ENGINE STARTING TIME)

| CHANGE LEVER | BLADE CLUTCH | ENGINE START |
|---|---|---|
| RUN | ON | PROHIBITED |
| RUN | OFF | PROHIBITED |
| NEUTRAL | ON | PROHIBITED |
| NEUTRAL | OFF | OK |

FIG.9

(DURING ENGINE RUNNING)

| CHANGE LEVER | BLADE CLUTCH | SAFETY HANDLE | ENGINE |
|---|---|---|---|
| RUN | ON | RELEASED | STOP |
| RUN | ON | HELD | RUN |
| RUN | OFF | RELEASED | STOP |
| RUN | OFF | HELD | RUN |
| NEUTRAL | ON | RELEASED | STOP |
| NEUTRAL | ON | HELD | RUN |
| NEUTRAL | OFF | RELEASED | RUN |
| NEUTRAL | OFF | HELD | RUN |

SAFETY SYSTEM FOR A LAWN MOWER

BACKGROUND OF THE INVENTION

1. Field of the Invention

The present invention relates to a safety system for a lawn mower having an engine, a propelling transmission system for transmitting drive from the engine to a propelling mechanism, and a PTO transmission system for transmitting the drive of the engine to a grass cutting unit.

2. Description of the Related Art

A riding type lawn mower or a relatively large lawn mower of the type handled by a walking operator has a self-propelling construction with drive of the engine transmitted to running devices as well as grass cutting blades. The self-propelled walking operator type lawn mower, for example, has various operating modes for selection, such as a self-propelled grass cutting operation in which both the propelling devices and cutting blades are driven, a grass cutting operation carried out with the operator pushing the lawn motor in which the propelling devices are stopped and only the cutting blades are driven, and a traveling mode in which the cutting blades are stopped and the propelling devices are driven.

When the engine of the lawn mower of this type is started with the grass cutting blades connected to the engine (i.e. with a cutting blade clutch engaged), for example, the cutting blade will suddenly begin rotating upon start of the engine. Further, while the lawn mower engages in a grass cutting operation or is just moved from one location to another in the self-propelled state with the engine running, the operator may inadvertently lose control of the lawn mower, such as by releasing his or her hold of the steering handle in the case of the walking operator type lawn mower or by leaving the driver's seat in the case of the riding type lawn mower. In such a situation, the lawn mower could run unattended away from the operator.

SUMMARY OF THE INVENTION

The object of the present invention is to promote safety in various operating states of a self-propelled riding type lawn mower or a self-propelled lawn mower of the type controlled by a walking operator.

The above object is fulfilled, according to the present invention, by a safety system for a lawn mower having an engine, a propelling transmission line for transmitting drive from the engine to drive wheels, and a PTO transmission line for transmitting drive from the engine to a grass cutting unit, the safety system comprising;

a first detecting device for detecting an operative state and an inoperative state of the propelling transmission line, a second detecting device for detecting an operative state and an inoperative state of the PTO transmission line, a third detecting device for detecting a driving state and a non-driving state of a driver, and a control device connecting to the first, second and third detecting device for controlling the engine in response to results of detection, the control device being operable to;

allow the engine to be started when the first detecting device and the second detecting device detects the inoperative states, stop the engine when the first detecting device detects the operative state and the third detecting device detects the non-driving state, and stop the engine when the second detecting device detects the operative state and the third detecting device detects the non-driving state.

According to this construction, the engine may be started only when drive transmission to both drive wheels and grass cutting blades is broken. The engine cannot be started when the drive is transmitted to the cutting blades.

Consequently, the cutting blades are prevented from rotating suddenly with start of the engine. When the lawn mower engages in a grass cutting operation in a self-propelled mode or is just moving with the engine running, the engine is stopped once the driver ceases to be in the driving state. This prevents the lawn mower from running unattended.

In the case of a lawn mower of the type operable by a walking operator, the operator may push the mower in a grass cutting operation with the cutting blades driven and drive wheels disconnected from the engine drive. When, in this case, the operator inadvertently releases a steering handle, the engine is stopped. This is effective to avoid such situations as the mower being mishandled during a push-mode grass cutting operation to cause the cutting blades to strike with a rock or the like or to cause the operator's feet to contact the cutting blades.

As described above, the engine cannot be started unless the drive transmission to both the drive wheels and cutting blades is broken. The engine is automatically stopped when the driver ceases to be in the driving state during a grass cutting operation or movement of the mower from one location to another. Thus, enhanced safety is assured for a grass cutting operation and transportation in addition to safety at an engine starting time.

Other objects and features of this invention will be understood from the following description made with reference to the accompanying drawings.

DETAILED DESCRIPTION OF THE PREFERRED EMBODIMENTS

An embodiment of the present invention will be described hereinafter with reference to the drawings.

Figure 1:
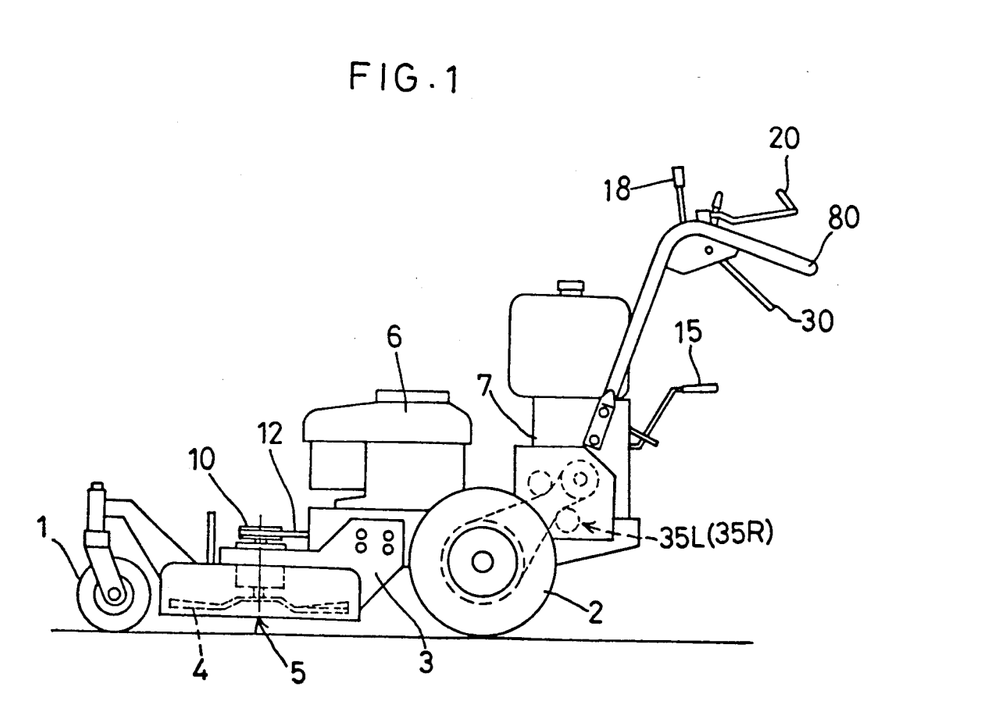
FIG. 1 is a side elevation of a walking operator type lawn mower employing a safety system according to the present invention.

As shown in FIG. 1, a self-propelled lawn mower of the type handled by a walking operator comprises right and left front wheels 1, right and left rear wheels 2, and a vehicle body 3 carried by the front and rear wheels 1 and 2. The vehicle body 3 supports a grass cutting unit 5 mounted in a lower position thereof and including two rotary blades 4, an engine 6 mounted centrally of the vehicle body 3, and a steering handle 80 extending rearwardly of the vehicle body 3.

Figure 2:
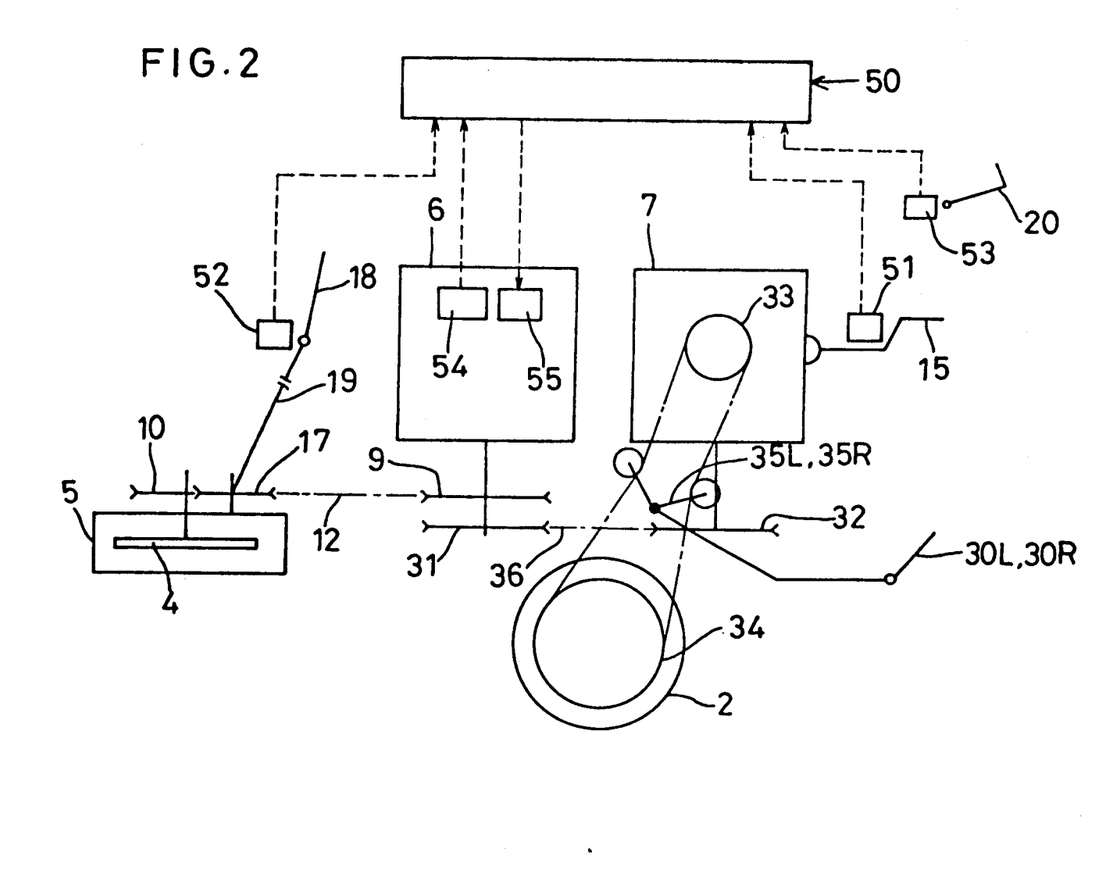
FIG. 2 is a block diagram of the safety system.

This lawn mower has the following propelling transmission structure:

As shown in FIGS. 1 and 2, drive is transmitted from the engine 6 to a propelling transmission 7 mounted rearwardly of the vehicle body 3, through a drive pulley 31, a transmission belt 36 and a driven pulley 32. The transmission 7, which is itself known, is operable by a change speed lever 15 to provide five forward speeds and one backward speed. The drive, after a change speed operation, is transmitted through a pair of bevel gears, arranged perpendicular to each other as well known in the art, and through right and left belt transmission mechanisms 33 and 34 to the right and left rear wheels 2. The right and left belt transmission mechanisms 33 and 34 have side clutches 35R and 35L, respectively, which are operable by side clutch levers 30R and 30L as will be described in detail later. Details of the side clutches of the belt transmission mechanisms are disclosed in U.S. Pat. No. 4,934,989, for example.

A transmission structure for driving the cutting blades 4 will be described next.

Figure 3:
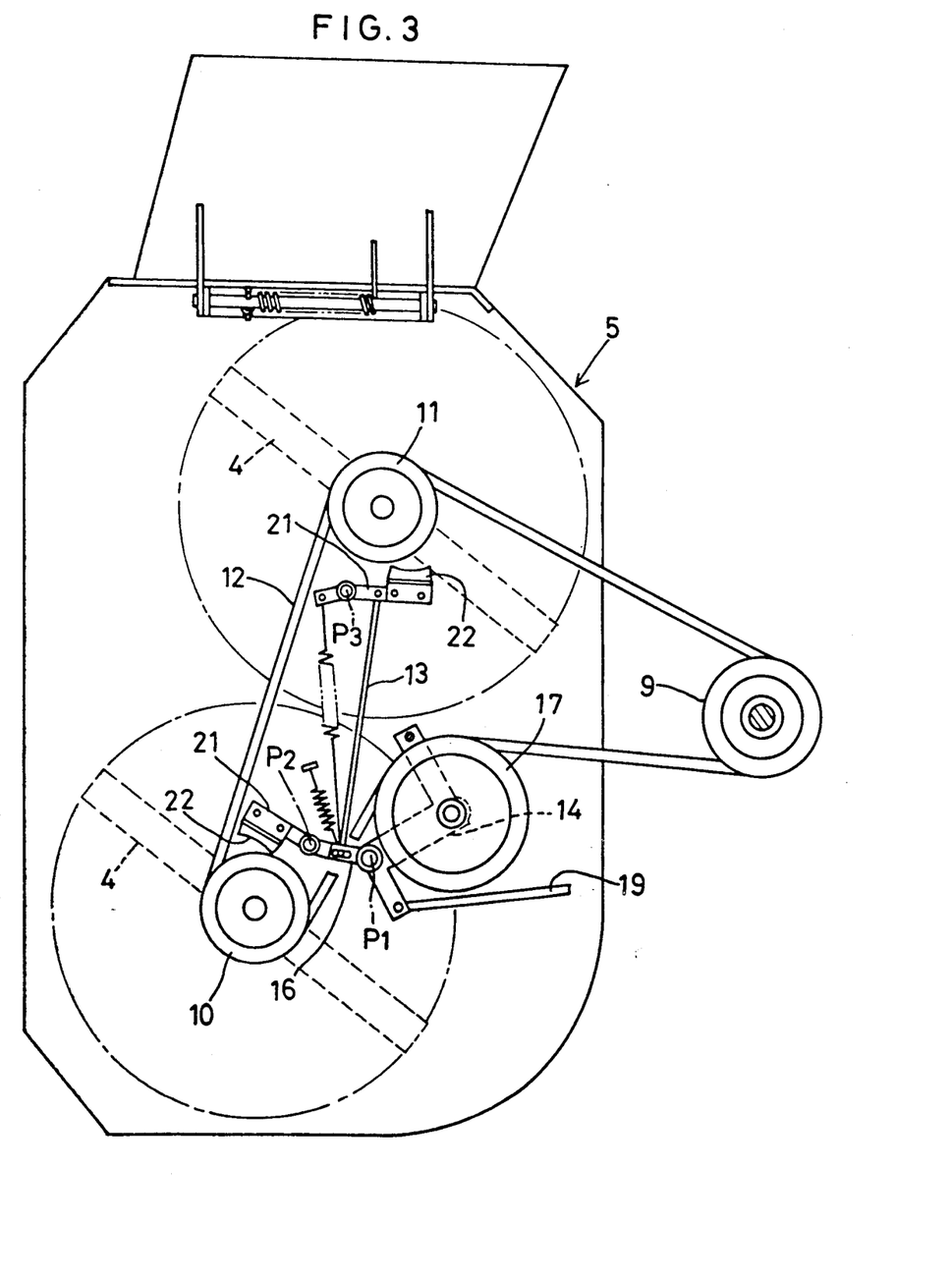
FIG. 3 is a plan view of an input pulley and adjacent components of a grass cutting unit.

As shown in FIGS. 1 through 3, the drive of the engine 6 is transmitted from an output pulley 9 through a transmission belt 12 to input pulleys 10 and 11 of the right and left cutting blades 4. The grass cutting unit 5 includes a tension arm 14 oscillatable about a vertical axis P1 and carrying a tension pulley 17. The tension arm 14 is operatively connected through an interlocking rod 19 to a blade clutch lever 18 shown in FIG. 1. Thus, the blade clutch lever 18 is operable to make and break the drive transmission to the cutting blades 4. As shown in FIG. 3, the grass cutting unit 5 further includes brake arms 21 oscillatable about vertical axes P2 and P3 and carrying brake shoes 22, respectively. The two brake arms 21 are interconnected by an interlocking rod 13. One of the brake arms 21 is pin-connected at one end thereof to an arm 16 fixed to the tension arm 14. Thus, when the blade clutch lever 18 is operated to break the drive transmission to the cutting blades 4, the brake arms 21 are swung to apply brakes to the input pulleys 10 and 11.

The steering handle 80 and adjacent components will be described next.

Figure 4:
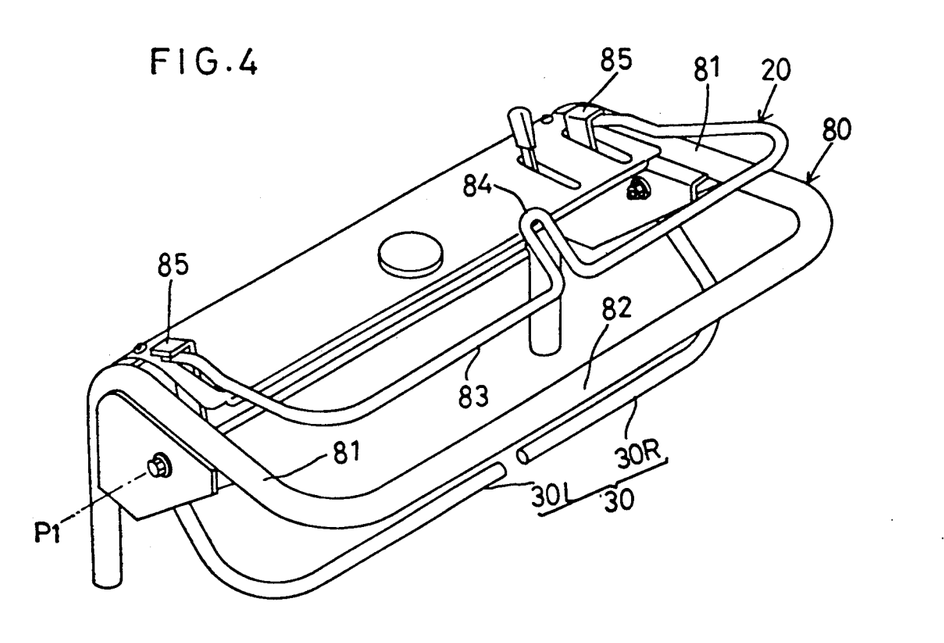
FIG. 4 is a perspective view of a steering handle region.

As shown in FIGS. 1 and 4, the steering handle 80 has an arch-like configuration including right and left rod portions 81 extending longitudinally of the vehicle body 3, and a grip portion 82 extending transversely of the vehicle body 3. The right and left clutch levers 30R and 30L, which are L-shaped in plan view, are connected at proximal ends thereof to the rod portion 81 of the steering handle 80 to be oscillatable about a transverse axis P1, respectively. The clutch levers 30R and 30L have distal ends disposed close to each other adjacent the middle of the grip portion 82 of the steering handle 80. The right and left side clutches 35R and 35L are operatively connected to the clutch levers 30R and 30L, respectively, through interlocking rods not shown. Either of the side clutches 35R and 35L is disengaged when the associated clutch lever 30R or 30L is lifted, to allow the walking operator to turn round the lawn mower lightly. It is also possible, when the two sides clutches 35R and 35L are disengaged, for the operator to push the lawn mower.

The safety handle or auxiliary handle 20 will be described in detail next.

As shown in FIGS. 1, 4, 5 and 6, the auxiliary handle 20 has a shape similar to and slightly smaller than the steering handle 80, and is movable in a region inwardly of the steering handle 80 with respect to the vehicle body 3.

Figure 5:
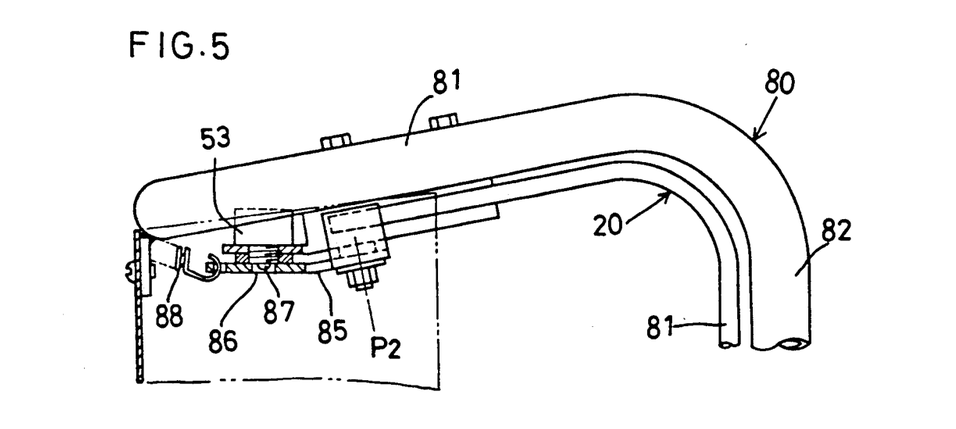
FIG. 5 is a plan view of a portion of a steering handle.
Figure 6:
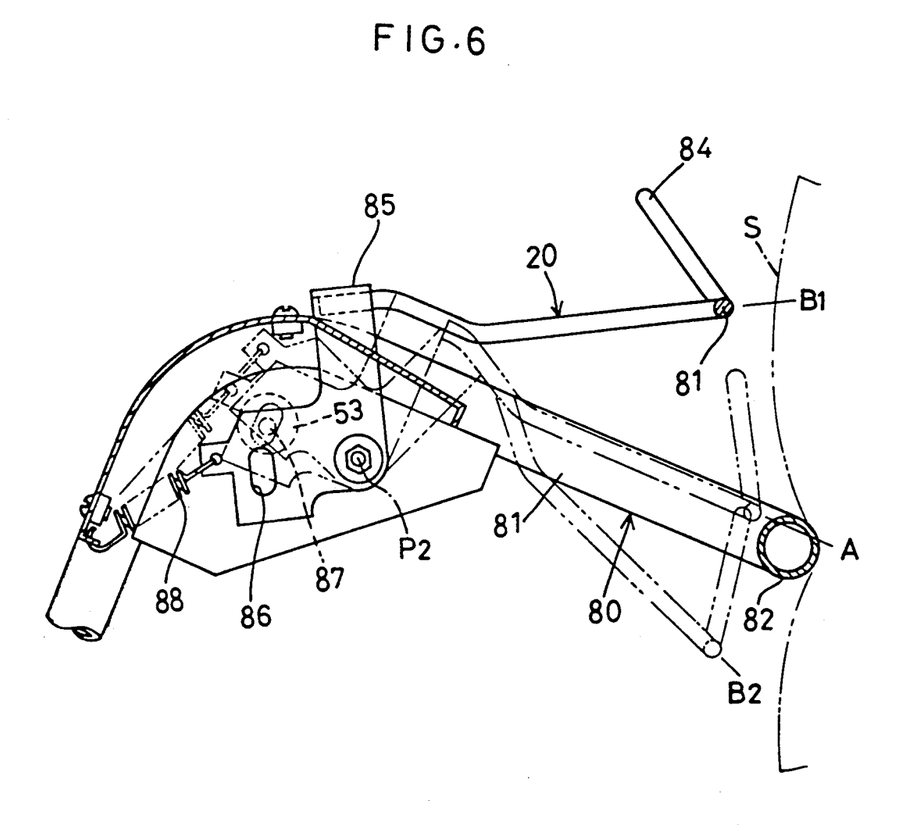
FIG. 6 is a view in vertical section of the steering handle region.

The auxiliary handle 20 is connected at right and left proximal ends thereof to right and left support arms 85 supported by the rod portions 81 of the steering handle 80 to be pivotable about a transverse axis P2. The auxiliary handle 20 includes a grip portion 83 which is curved at a mid-position thereof to form an upward projection 84. One of the support arms 85 defines a bore 86 opposed to a switch 53 fixed to the steering handle 80. The switch 53 has a contact 87 which extends into the bore 86 when the auxiliary handle 20 is in an operative position A. The support arms 85 have springs 88 attached thereto for upwardly urging the auxiliary handle 20. The intermediate position shown in a two-dot-and-dash line in FIG. 6 is the operative position A of the auxiliary handle 20 whose grip portion 83 is placed substantially level with the grip portion 82 of the steering handle 80, with the operator holding both the steering handle 80 and auxiliary or safety handle 20. In this state, the contact 87 of the switch 53 extends into the bore of the support arm 85 and the engine 6 is running. In this state, as shown in FIGS. 5 and 6, the auxiliary handle 20 extends along and is surrounded by the rod portions 81 and grip portion 82 of the steering handle 80.

When, in the state shown in FIG. 6, the operator releases the steering handle 80 and auxiliary handle 20, the latter moves to an upper inoperative position B1 under the force of spring 88. The auxiliary handle 20 is also movable to a lower inoperative position B2 by the operator pressing down the projection 84 with an upper part of his or her body, for example.

In either of the inoperative positions B1 or B2, the bore 86 of the support arm 85 is displaced upwardly or downwardly from the contact 87 of the switch 54, whereby the contact 87 is depressed. Then the switch 53 transmits a signal to a control unit 50 for use in controlling the operation of engine 6 as described later.

The safety handle 20 as described above has little chance of being locked in the operative position since the grip portion thereof in the operative position is surrounded by the grip portion of the steering handle 80. The engine is reliably controlled, e.g. stopped, when the operator releases the steering and auxiliary handles, thereby to assure safety. The projection formed by the grip of the auxiliary handle enables the engine to be stopped by an obstacle moving onto the steering handle.

A safety system according to the present invention will be described next with reference to FIG. 2.

The safety system includes a first detecting device 51 and a second detecting device 52 connected to the control unit 50. The first detecting device 51 is formed of a limit switch for detecting the change speed lever 15 of the transmission 7 shown in FIG. 1 being in neutral. The second detecting device 52 includes a pair of limit switches for detecting positions of the blade clutch lever 18. The above-mentioned switch 53 of the safety lever 20 is also connected to the control unit 50.

The engine 6 comprises a gasoline engine of the electric ignition type using spark plugs. The control system further includes a detector 54 and a switch 55 connected to the control unit 50, the former for detecting a running state of the engine and the latter for breaking power supply to the spark plugs to stop the engine.

Figure 7:
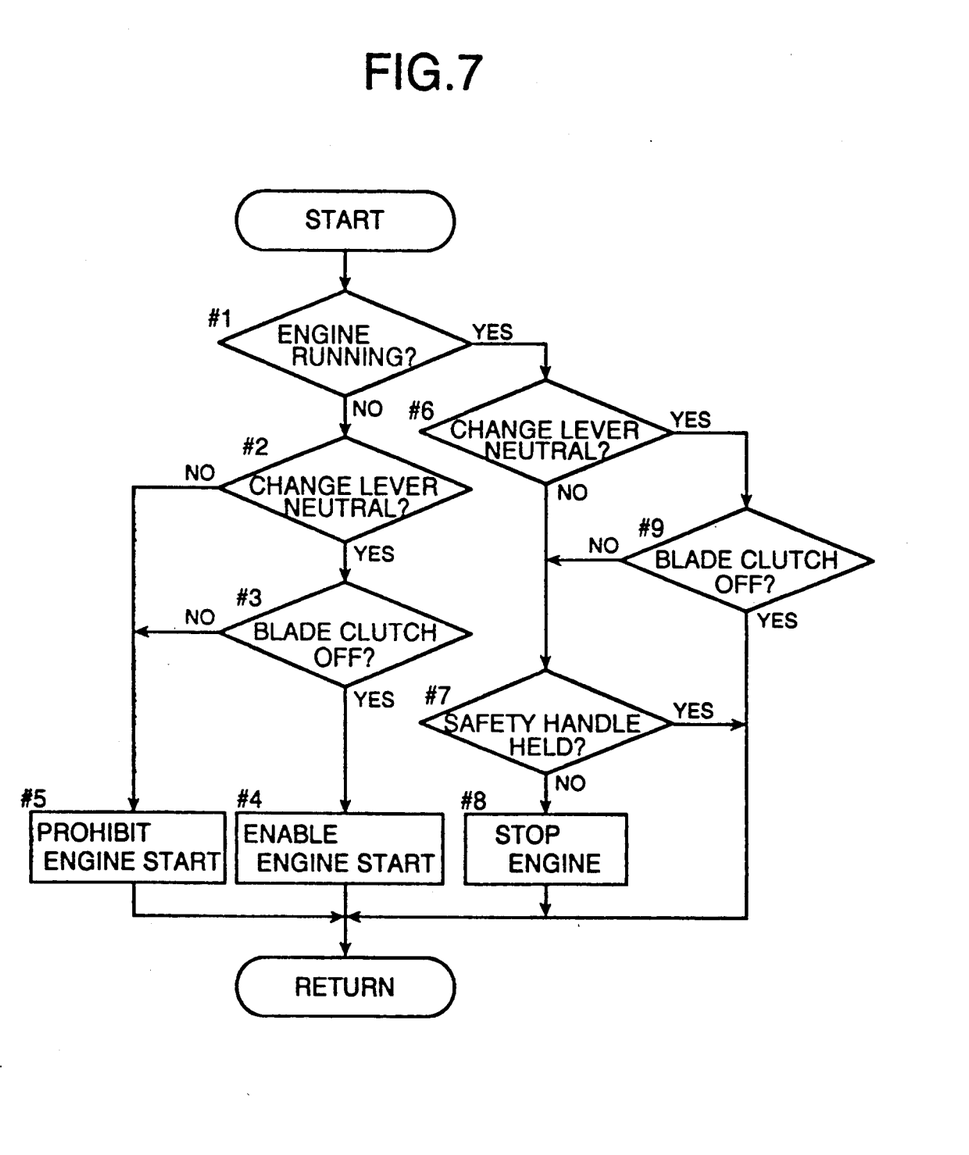
FIG. 7 is a flowchart of a control sequence.

The control unit 50 may be formed of hardware, or may essentially comprise software with a microcomputer acting as a central component. Its functions will now be described with reference to FIG. 7 showing an outline of control sequence.

The engine 6 may be started only when the change speed lever 15 of the transmission 7 is in neutral (the drive transmission to the wheels 2 is broken) and the blade clutch lever 18 is in an off position (the drive transmission to the cutting blades 4 is broken) (steps #1 through #4). The engine 6 cannot be started under other conditions (step #5) (which corresponds to the first control device). This engine 6 is a gasoline engine of the electric ignition type using spark plugs not shown, as noted hereinbefore. For preventing the engine 6 from being started, power supply to the spark plugs is broken.

Next, with the engine 6 running, the lawn mower engages in a grass cutting operation normally with the safety handle 20 lowered to the steering handle 80 and the operator holding the two handles together.

When the change speed lever 15 of the transmission 7 is in a position other than neutral (i.e. in a drive position), the engine 6 is stopped regardless of the position of the blade clutch lever 18 once the operator releases the safety handle 20 and allows this handle to be lifted as shown in FIG. 1 (i.e. the operator is not in a position to control the lawn mower). In this case, as in the foregoing case, the engine 6 is stopped by cutting power supply to the spark plugs (steps #6 through #8).

When the change speed lever 15 is in neutral with the engine 6 running and the blade clutch lever 18 is in the clutch engaging position (for transmitting the drive to the cutting blades 4), the engine 6 is stopped once the operator releases the safety handle 20 and allows this handle to be lifted as shown in FIG. 1 (steps #6, #9, #7 and #8). In this case too, the engine 6 is stopped by cutting power supply to the spark plugs. The engine 6 is not stopped even if the safety handle 20 is released, as long as the change speed lever 15 is in neutral and the blade clutch lever 18 is off.

Figure 8:
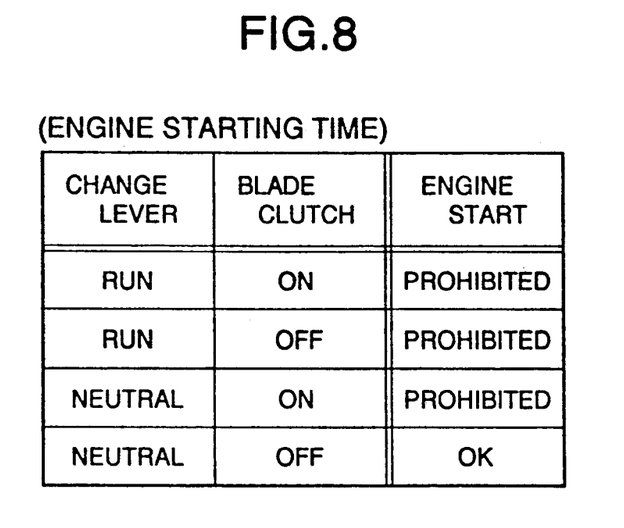
FIG. 8 is a table showing various states at an engine starting time.
Figure 9:
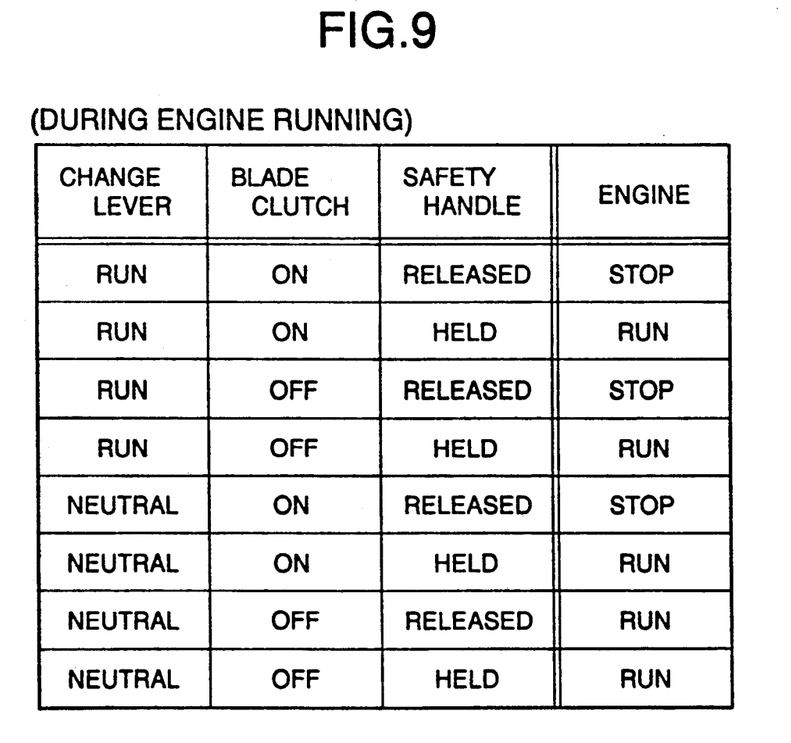
FIG. 9 is a table showing various states during running of the engine.

The above functions of the control unit 50 are listed in tables in FIGS. 8 and 9.

Figure 10:
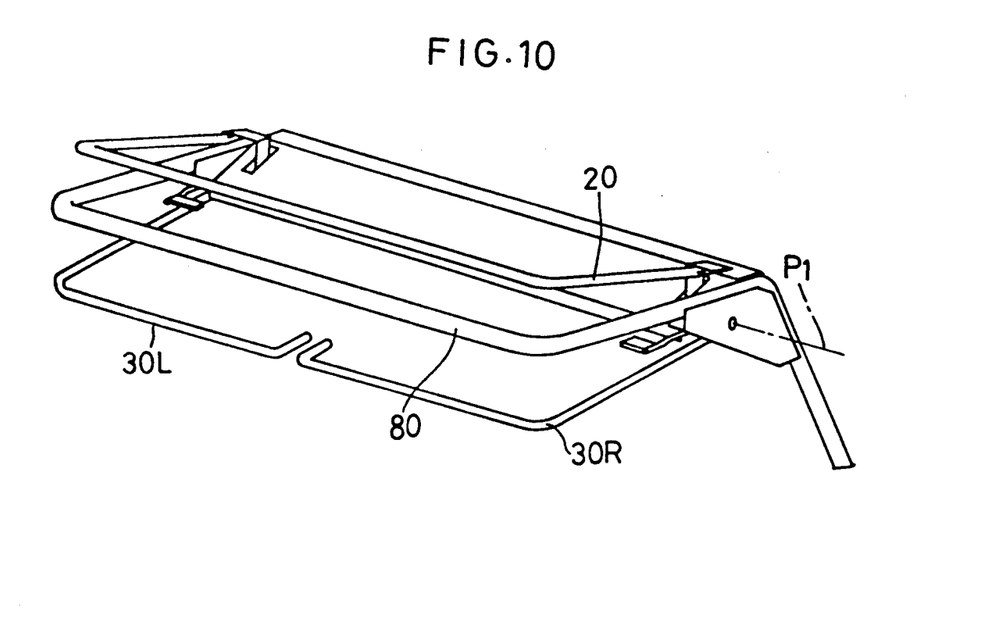
FIG. 10 is a perspective view of a steering handle region in a different embodiment.

In the foregoing embodiment, the controls are based on whether the change speed lever 15 of the transmission 7 is in neutral or not. However, the controls may be based on whether the right and left side clutches 35R and 35L shown in FIG. 1 are disengaged at the same time or not. For this purpose, detectors may be provided and connected to the control unit 50 for detecting positions of the side clutch levers 30R and 30L. A clutch lever structure embodying this concept will be described with reference to FIGS. 10 and 11. FIG. 10 shows a handle structure substantially corresponding to the structure of FIG. 4, but those components, such as the safety handle 20, which have no direct relevance to the side clutch levers are shown in simplified forms.

As shown in FIG. 10, right and left clutch levers 30R and 30L, L-shaped in plan view, are connected at proximal ends thereof to the steering handle 80 to be oscillatable about a transverse axis P1. The clutch levers 30R and 30L have distal ends disposed close to each other adjacent the middle of the grip portion of the steering handle 80.

Figure 11:
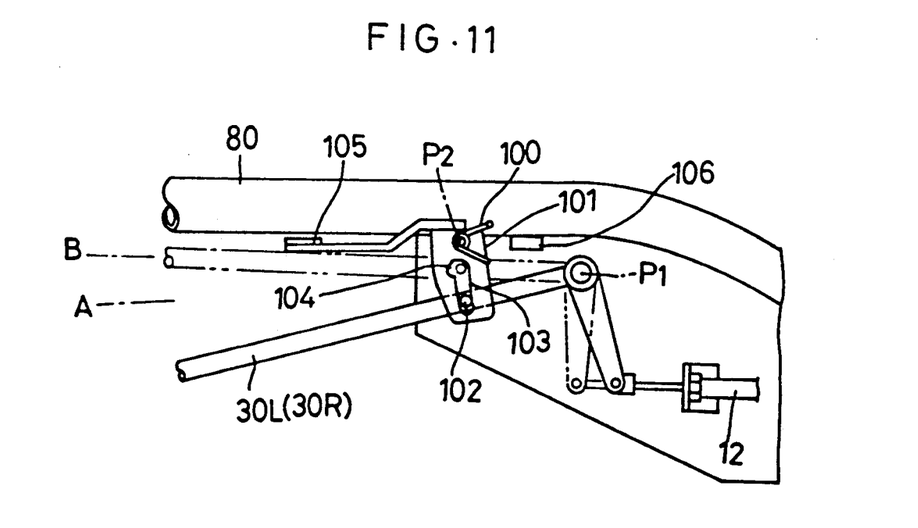
FIG. 11 is a side view of the steering handle region shown in FIG. 10.

As shown in FIG. 11, the right and left side clutches 35R and 35L are operatively connected to the clutch levers 30R and 30L through wires 12, respectively. Either of the side clutches 35R and 35L is disengaged when the associated clutch lever 30R or 30L is lifted to a position A. This allows the walking operator to turn round the lawn mower. It is also possible, when the two side clutches 35R and 35L are disengaged, for the operator to push the lawn mower. When either clutch lever 30R or 30L is lifted to a position B, one of side brakes (not shown) acts on one rear wheel 2 to allow a small, sharp turn of the lawn mower. Each clutch lever 30R or 30L has a locking structure provided at the proximal end thereof for holding the clutch lever in the position B to apply the side brake. This locking structure will be described next.

As shown in FIG. 11, the locking structure includes an engaging member 101 pivotable about the axis P2 and urged clockwise by a helical spring 100. The clutch lever 30R or 30L carries a pin 102 which in a normal state is located in a slot 103 defined in the engaging member 101. This structure allows pivotal movement of the clutch lever 30R or 30L. After lifting the clutch lever 30R or 30L to the position B shown in a two-dot-and-dash line, the operator pushes down a control arm 105 extending from the engaging member 101. This causes an engaging bore 104 in the engaging member 101 to slip under the pin 102, thereby to maintain the clutch lever 30R or 30L in the position B.

The steering handle 80 carries a pair of right and left proximity switches 106 attached to undersurfaces thereof for detecting the clutch levers 30R and 30L in operative position. These proximity switches 106 are connected to the control unit 50 which determines transmission of the engine drive to the drive wheels being broken when the switches 106 are turned on by the clutch levers 30R and 30L lifted.

Further, the preceding embodiment may be modified so that the controls are carried out by detecting the cutting blades 4 being driven or not which is based on the position of the tension arm 14 shown in FIG. 2, instead of the position of the blade clutch lever 18. While the embodiments have been described in relation to a lawn mower of the type operable by a walking operator, the present invention is applicable also to a riding lawn mower. In this case, a pressure sensor is mounted under a driver's seat for detecting whether a driver is seated or not. If a driver is seated, it is determined that he or she is in a position to drive the lawn mower (which corresponds to holding of the safety handle 20). Otherwise, it is determined that the driver is not in the position to drive the lawn mower.

What is claimed is:

1. A safety system for a lawn mower having an engine, a propelling transmission line for transmitting drive from the engine to drive wheels, and a PTO transmission line for transmitting drive from the engine to a grass cutting unit, said safety system comprising;

first detecting means for detecting an operative state and an inoperative state of said propelling transmission line, second detecting means for detecting an operative state and an inoperative state of said PTO transmission line, third detecting means for detecting a driving state and a non-driving state of a driver, and control means connected to said first, second and third detecting means for controlling said engine in response to results of detection, said control means being operable to;
 allow said engine to be started when said first detecting means and said second detecting means detect the inoperative states,
 stop said engine when said first detecting means detects the operative state and said third detecting means detects the non-driving state, and
 stop said engine when said second detecting means detects the operative state and said third detecting means detects the non-driving state.

2. A lawn mower comprising;
 an engine,
 drive wheels,
 a grass cutting unit,
 a steering section,
 a propelling transmission line for transmitting drive from said engine to said drive wheels,
 a PTO transmission line for transmitting drive from the engine to a grass cutting unit, said PTO transmission line including a PTO clutch,
 first detecting means for detecting an operative state of said propelling transmission line,
 second detecting means for detecting a state of said PTO clutch,
 third detecting means provided in said steering section for detecting a driving state and a non-driving state of a driver, and
 control means connected to said first, second and third detecting means for controlling said engine in response to results of detection, said control means being operable to;
 allow said engine to be started when said first detecting means and said second detecting means detects inoperative states,
 stop said engine when said first detecting means, detects the operative state and said third detecting means detects the non-driving state, and
 stop said engine when said second detecting means detects the operative state and said third detecting means detects the non-driving state.

3. A lawn mower as claimed in claim 2, wherein said steering section includes an arch-like steering handle, and an auxiliary handle having a shape substantially corresponding to said steering handle and pivotable from an upper position projecting above said steering handle and a lower position depressed below said steering handle, said auxiliary handle being spring-loaded to said upper position or said lower position, and said third detecting means being operable to detect the driving state when said auxiliary handle is in an intermediate position adjacent said steering handle.

4. A lawn mower as claimed in claim 3, wherein said first detecting means is operable to detect a position of a change speed lever of a transmission included in said propelling transmission line.

5. A lawn mower as claimed in claim 3, wherein said first detecting means is operable to detect positions of a change speed lever of a transmission included in said propelling transmission line and of control levers of side clutches included in said propelling transmission line.

* * * * *